United States Patent [19]

Beeck et al.

[11] Patent Number: 4,679,145
[45] Date of Patent: Jul. 7, 1987

[54] METHOD AND APPARATUS FOR CONTROLLING A CLUTCH-TRANSMISSION UNIT

[75] Inventors: Peter op de Beeck, Nokere, Belgium; Rainer Wuest, Wiernsheim; Norbert Stelter, Weissach, both of Fed. Rep. of Germany

[73] Assignee: Dr. Ing. h.c.F. Porsche Aktiengesellschaft, Fed. Rep. of Germany

[21] Appl. No.: 672,612

[22] Filed: Nov. 19, 1984

[30] Foreign Application Priority Data

Nov. 18, 1983 [DE] Fed. Rep. of Germany ....... 3341652

[51] Int. Cl.⁴ ...................... B60K 41/08; G06F 15/20
[52] U.S. Cl. ................................. 364/424.1; 74/866
[58] Field of Search ..................... 364/424.1; 74/866

[56] References Cited

U.S. PATENT DOCUMENTS

| 4,353,272 | 10/1982 | Schneider et al. | 74/866 X |
| 4,408,293 | 10/1983 | Avins | 364/424.1 X |
| 4,463,427 | 7/1984 | Bonnetain et al. | 364/424.1 X |
| 4,490,790 | 12/1984 | Shinoda | 364/424.1 |
| 4,523,281 | 6/1985 | Noda et al. | 364/424.1 |
| 4,551,802 | 11/1985 | Smyth | 364/424.1 |

OTHER PUBLICATIONS

Lorenze et al.: Application of the 4HP22 Four-Speed automatic Transmission with Electronic/Hydraulic Control, ATZ-Automobiltechnische Zeitschrift, vol. 85, No. 6, pp. 401–405.

Primary Examiner—Felix D. Gruber
Attorney, Agent, or Firm—Barnes & Thornburg

[57] ABSTRACT

A method and apparatus for controlling a clutch-transmission unit which makes it possible to intentionally influence the selection of the shifting steps by a parameter which is gained from the detected and stored values of the drive pedal position. Together with further parameters such as transverse acceleration, deceleration and coasting operation, the transmission control is matched optimally to the driving style of the respective driver and to the traffic situation which prevails at that moment.

40 Claims, 6 Drawing Figures

METHOD AND APPARATUS FOR CONTROLLING A CLUTCH-TRANSMISSION UNIT

BACKGROUND AND SUMMARY OF THE INVENTION

The present invention relates to a method and apparatus for controlling a clutch-transmission unit, especially of a motor vehicle equipped with an internal combustion engine, in which the internal combustion engine is adapted to be influenced by means of an output control device, such as a drive pedal, and the speeds of the transmission unit are automatically shifted at least as a function of the position of the drive pedal and of the engine rotational speed.

Customarily, an automatic transmission control is designed according to the following criteria: either it is to permit a drive which is as economic as possible or a drive which is as output oriented as possible. By reason of the properties of the Otto engine, it is not possible to fulfill both criteria at the same time. Consequently, frequently only a compromise between both extremes is realistic since a shifting program which is purely consumption-oriented, does not offer sufficient safety reserves in critical traffic situations and with a shifting program that is output oriented, the fuel consumption is too high.

A further possibility is the manual shifting between an "economy" and a "power" program, (Automobiltechnische Zeitschrift 85, Volume 6/1983, pages 401-405). This solution entails the disadvantage that the driver has to actuate first a shifting member before a corresponding shifting program is made available to him. A further disadvantage resides in the fact that only two alternative extremes are offered to the driver which permit either only a consumption-oriented driving manner or an output-oriented driving manner.

Furthermore, it has to be recognized as disadvantage that this automatic transmission unit cannot shift correctly as regards a given situation when driving through curves or during braking or during the transition into coasting operation (taking the foot off the drive pedal), because only the instantaneous drive pedal information is available to it from the driver as the sole information transmitter concerning the traffic situation. If the driver takes his foot off the drive pedal at the entry of a curve or prior to the braking or during the transition into the coasting operation, then the automatic transmission initiates a shifting-up. If the driver again gives gas at the exit of the curve or after the braking operation or after termination of the coasting operation, then the automatic system at first has to shift back or down before the driver obtains the requested output. This means loss in time, loss in driving comfort and therebeyond additional clutch and transmission wear.

In addition to the deterioration of the actuating comfort, a further disadvantage is the additional time loss for the "searching" and "actuation" of the shifting member in case shifting is to take place in a short period of time from the "economy" to the "power" program, for example, by reason of the traffic situation.

For avoiding the last-mentioned disadvantages, an automation of the manual switching is proposed in U.S. Pat. No. 4,353,272 (DE OS No. 28 11 574); a program control unit is then switched from consumption optimal to output optimal operation if the (instantaneous) deflection velocity of the drive pedal exceeds a predetermined value. As a result thereof, the disadvantages of the manual shifting are eliminated, however, at the expense of one of its advantages, i.e., the memory effect of the mechanical shifting member. For, by reason of the missing memory effect, the power-optimal shifting program must be requested anew by a rapid depressing of the drive pedal every time one should or must drive smoothly and speedily, which in the final analysis will result in an increased fuel consumption and a "jerky" drive.

Accordingly, it is the object of the present invention to provide a control system for a clutch-transmission unit which, starting from a shifting program that is as consumption-optimal as possible, adapts itself to the driving behavior of the driver and to the just-prevailing driving, respectively, traffic situation without the need that additional operating elements have to be actuated.

The underlying problems are solved according to the present invention in that a drive pedal signal, proportional to the position of the drive pedal, is detected cyclically and/or anti-cyclically; in that by means of the scanned drive pedal signal value, these drive pedal signal values, which are detected and stored over detecting or scanning intervals, are continuously updated; and in that a drive pedal activity signals, evaluating the driving style of a driver and/or a driving situation, are calculated from these stored drive pedal signal values and are used for influencing limit values for shifting decisions.

The advantages which are attained principally by means of the present invention reside in the fact that, by simple means, a control for a clutch-transmission unit is created which, starting from a shifting program that is as consumption-optimal as possible, adapts itself dynamically to the driving behavior of the driver and to the just-prevailing driving, respectively, traffic situation without the need for actuating additional operating elements. Owing to the "continuous" transition from the consumption-oriented shifting program to the power- or output-oriented shifting program, the driving performance can be made available to the driver at any given time which he requests whereby attention is always paid in all ranges to the lowest possible fuel consumption. In addition to the reduction of the fuel consumption, additionally, the driving safety is increased, and more particularly, by the shifting operations carried out correctly from the situation point of view, thus also in curves, during braking and in coasting operation. By reducing the shifting operations, the transmission and clutch wear is reduced and the driving comfort is additionally increased.

These and further objects, features and advantages of the present invention will become more apparent from the following description when taken in connection with the accompanying drawing which shows, for purposes of illustration only, several embodiments in accordance with the present invention, and wherein:

DETAILED DESCRIPTION OF THE DRAWINGS

Figure 1:
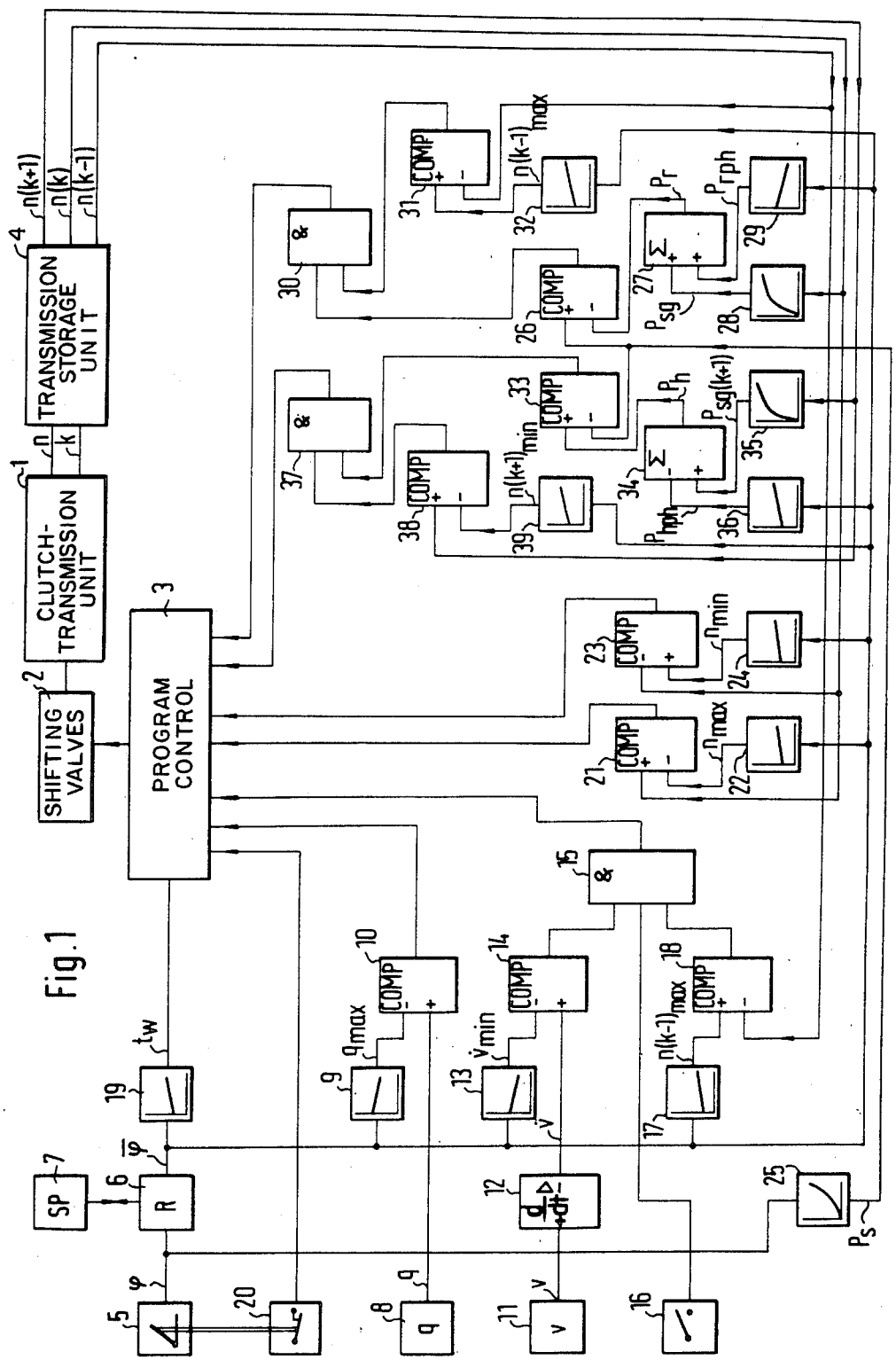
FIG. 1 is a block diagram of the control unit in accordance with the present invention for a clutch-transmission unit.
Figure 6:
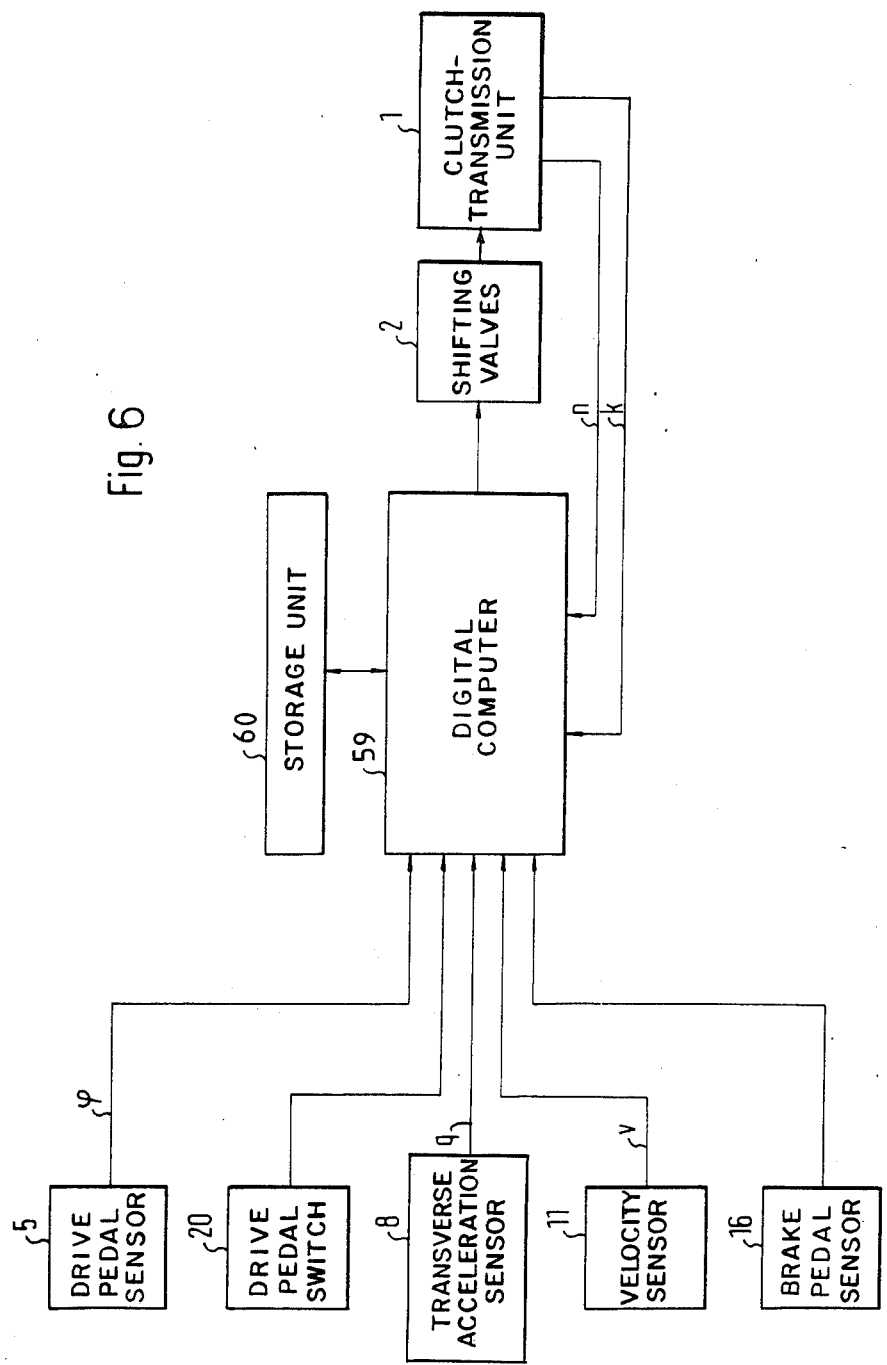
FIG. 6 is a block diagram for the realization of the control system by means of a digital computer in accordance with the present invention.

Referring now to the drawing wherein like reference numerals are used throughout the various views to designate like parts, and more particularly to FIG. 1, reference numeral 1 designates in this figure a clutch-transmission unit. Shifting valves 2 serve the purpose to actuate one or several clutches, respectively, to change the speeds. The shifting valves 2 receive their signals from a program control 3. A transmission-memory storage or translator unit 4 receives from the clutch-transmission unit 1 the values of transmission output rotational gear n and engaged speed k. In the transmission-memory unit 4, the values transmission input rotational speed $n(k)$, transmission input rotational speed in the next lowest gear $n(k-1)$ and transmission input rotational speed in the next higher gear $n(k+1)$ are held ready for further processing. These values may be calculated from the transmission output rotational speed n and the engaged speed or gear k in a computer unit (not shown) in FIG. 1 or in computer 59 as shown in FIG. 6 and discussed below. Furthermore, a drive pedal 5 produces a drive pedal signal $\phi$ proportional to the drive pedal position.

These parameters are customarily used for the transmission control. As can be seen from the block diagram and the following description, the transverse acceleration, the deceleration and the coasting operation are additionally used as inputs in the transmission control system. Therebeyond, the transmission control system receives a "learning ability", i.e., a capability to match the shifting operations optimally to the driving style of the respective driver who at that moment controls the vehicle, and to the driving, respectively, traffic situation which prevails at that time.

For realizing this learning ability, the fact is used that the driving style of the driver, respectively, his reaction to traffic situations, will be expressed in the first instance by a different depressing of the drive pedal. The drive pedal position, respectively, its change in the past and at the present time can therefore be used as representative magnitude for obtaining a control parameter in order to be able to realize this "learning ability"; this control parameter will be referred to hereinafter as drive pedal activity $\bar{\phi}$.

For that purpose, a drive pedal computer unit 6 interrogates or samples the drive pedal signal $\phi$ cyclically or anticyclically and stores the sampled or detected value $\phi(t)$ in the drive pedal memory unit 7. In this memory unit 7 $(m+1)$—values $\phi$ of the drive pedal signal from $(m+1)$ past scanning or detecting intervals $\Delta T$ are stored; these values are renewed cyclically during each scanning interval. The drive pedal computer unit 6 calculates from the stored values the drive pedal activity $\bar{\phi}$ by way of a weighted sum.

A transverse acceleration sensor 8 detects the transverse acceleration of the vehicle and produces a signal q corresponding thereto. A value $q_{max}$ is determined from the drive pedal activity $\bar{\phi}$ by way of a characteristic curve converter 9, which represents the upper limit for a shifting-up. A comparator 10 compares q with $q_{max}$. If $q > q_{max}$, then the comparator 10 produces a signal to the program control 3 which precludes an eventual shifting-up operation.

A velocity sensor 11 detects the vehicle velocity and produces a velocity signal v, from which a differentiator produces a deceleration signal $\dot{v}$ by means of an differentiator 12. A characteristic curve converter 13 converts the drive pedal activity $\bar{\phi}$ into a signal $\dot{v}_{min}$ which represents the minimum deceleration above which a shifting-back operation is still requested. A comparator 14 compares $\dot{v}$ with $\dot{v}_{min}$; if $\dot{v} < \dot{v}_{min}$, no shifting-back signal is applied to an AND element 15; however, if $\dot{v} > \dot{v}_{min}$, a shifting-back signal is applied to the AND element 15. Furthermore, the AND element 15 receives a signal from a brake pedal switch 16 when the brake pedal is actuated. A characteristic curve converter 17 coordinates to the drive pedal activity $\bar{\phi}$ a maximum rotational speed in the next lowest gear or speed $n(k-1)_{max}$. A comparator 18 compares $n(k-1)_{max}$ with $n(k-1)$ which it receives from the transmission storage unit 4; if $n(k-1) > n(k-1)_{max}$, no shifting-back signal is applied to the AND element 15; however, if this condition is not fulfilled, then a shifting-back signal is applied to the AND element 15. Only if all three conditions are fulfilled, the AND element 15 will produce a shifting-back signal applied to the control program 3.

A characteristic curve converter 19 produces from the drive pedal activity $\bar{\phi}$ a waiting period signal $t_w$, which is fed to the program control 3 for determining the waiting period until shifting-up takes place.

A drive pedal switch 20 produces a signal to the program control 3 when the drive pedal is not depressed (coasting operation) in order that no shifting-up operation takes place.

A comparator 21 compares continuously the actual transmission input rotational speed $n(k)$ from the transmission storage unit 4 with the maximum rotational speed $n_{max}$ which is determined by way of a characteristic curve converter 22 from the drive pedal activity $\bar{\phi}$. If $n > n_{max}$, then the comparator 21 produces a shifting-up signal to the program control 3; if $n < n_{max}$, no signal is produced. A comparator 23 serves for the continuous comparison of the actual transmission input rotational speed $n(k)$ from the transmission memory unit 4 with the minimum rotational speed $n_{min}$ determined from the drive pedal activity $\bar{\phi}$ by the characteristic curve converter 24. If $n < n_{min}$, a shifting-back signal is fed to the program control 3, otherwise this is not the case. The functions of the comparators 21 and 23 have priority over all other components connected to the program control 3 since they serve as protection functions for engine and transmission unit.

A characteristic curve converter 25 produces from the drive pedal signal $\phi$ a desired power or performance value $P_s$. A comparator 26 compares the desired performance value $P_s$ with a shifting-back performance or power $P_r$. The shifting-back power or performance $P_r$ is formed by an adding element 27 from the sum of a shifting limit performance or power $P_{sg}$ and from a shifting-back point hysteresis performance or power $P_{rph}$. The shifting limit performance or power $P_{sg}$ is gained from the transmission input rotational speed $n(k)$ by a characteristic curve converter 28 which reproduces the shifting line, while the shifting-back point hysteresis performance or power $P_{rph}$ is obtained from the drive pedal activity $\bar{\phi}$ by means of a characteristic curve converter 29. If the desired power or performance value $P_s$ is larger than the shifting-back power or performance $P_r$, the comparator 26 applies a shifting-back signal to an AND element 30. A comparator 31 examines whether the rotational speed in the next lower speed $n(k-1)$ from the transmission storage unit 4 is not higher than the maximum rotational speed in the next lower speed $n(k-1)_{max}$, which is determined by a characteristic curve converter 32 from the drive pedal activity $\bar{\phi}$; if this is not the case, the comparator 31 applies a shifting-back signal to an AND element 30. Only if shifting-back signals are present simultaneously from both comparators 26 and 31, the program control 3 receives the command for shifting-back from the AND element 30.

The request for shifting-up proceeds in a similar manner: a comparator 33 compares the requested desired power or performance $P_s$ with a shifting-up performance or power $P_h$. The shifting-up power or performance $P_h$ is determined in a subtracting element 34 from the difference of a shifting limit power or output in the next higher speed $P_{sg}(k+1)$ and a shifting-up hysteresis power or performance $P_{hph}$. The shifting limit output or performance in the next higher speed $P_{sg}(k+1)$ is determined from the rotational speed in the next higher speed or gear (from the transmission storage unit 4) by a characteristic curve converter 35 which reproduces a shifting line in the next higher speed. The shifting-up hysteresis power or performance $P_{hph}$ is received from the drive pedal activity $\bar{\phi}$ by a characteristic curve converter 36. If the desired power or performance $P_s$ is smaller than the shifting-up power or performance $P_h$, the comparator 33 applies a shifting-up signal to an AND element 37, otherwise no such signal is produced.

A comparator 38 compares the rotational speed in the next higher gear $n(k-1)$ (from the transmission memory unit 4) with a minimum rotational speed in the next higher gear $n(k+1)_{min}$; the minimum rotational speed in the next higher gear $\underline{n}(k+1)_{min}$ is determined from the drive pedal activity $\bar{\phi}$ by way of a characteristic curve converter 39. If $n(k+1) > n(k+1)_{min}$, then the comparator 38 applies a shifting-up signal to the AND element 37, otherwise no such signal is applied.

Only if shifting-up signals are present from both comparators 33 and 38, the AND element 37 gives the command for shifting-up to the program control 3. For the better understanding, a few remarks will be made as follows:

The function blocks 26, 27, and 29 as well as 33, 34 and 36 serve for the "shifting quieting", i.e., that the transmission does not continuously carry out shifting-up, respectively, shifting-down operations when the operating point of the system moves along the shifting line. The shifting line is therefore used also for a "shifting hysteresis".

The parameters which determine the gear selection can be varied by means of the drive pedal activity $\bar{\phi}$ (from the indication in paretheses it can be seen how the values change with increasing drive pedal activity):

Shifting limit for shifting-up (increase),
Shifting limit for shifting-back (reduce),
Shifting hysteresis width (reduce),
Minimum rotational speed in the engaged gear (increase),
Maximum rotational speed in the engaged gear (increase),
Minimum rotational speed in the next higher gear (increase),
Maximum rotational speed in the next lower gear (increase),
Maximum cross-acceleration at which it is still possible to shift-up (reduce),
Minimum deceleration in order to initiate a shifting-back during braking (reduce),
Maximum possible rotational speed in the next lower gear which during braking still permits a shifting-back (increase),
Waiting period during shifting-up (increase).

All characteristic curve converters may or must reproduce different characteristic lines dependent in each case from the engaged speed or gear k. These dependencies are omitted in the schematic diagram for the sake of simplicity.

Figure 2:
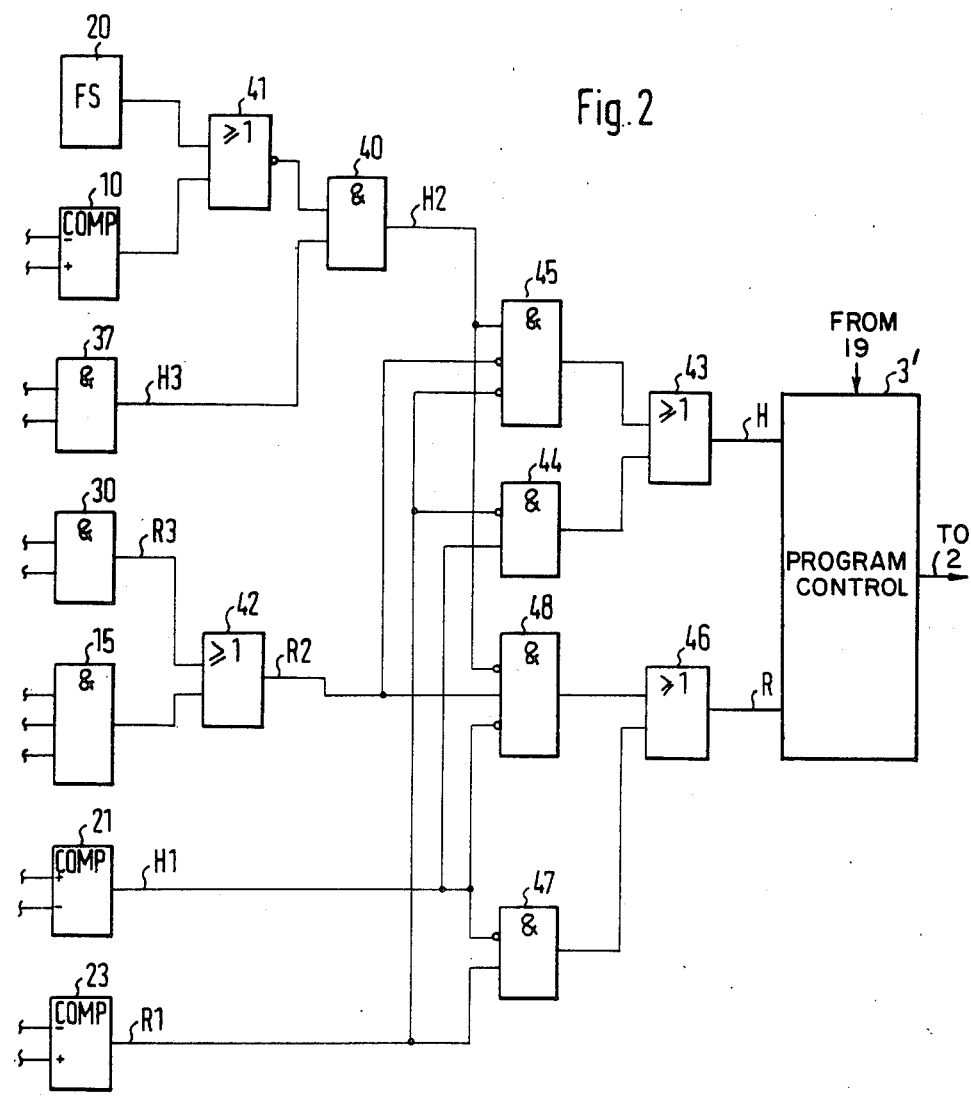
FIG. 2 is a block diagram for a priority control system in accordance with the present invention.

According to a further feature of the present invention, a priority control is connected in the input of the program control 3 which connects the input signals through to the program control corresponding to their importance. A solution for such a priority control by means of logic circuit elements will be described by reference to the schematic block diagram according to FIG. 2; the function elements from FIG. 1 which are connected to the inputs of the program control 3, are thereby indicated on the left side with the exception of the characteristic curve converter 19 while the program control 3' is indicated on the right side:

An AND element 40 switches through or connects through a shifting-up signal H3 from an AND element 37 only when no signal for blocking a shifting-up operation is present at a NOR element 41 from the drive pedal switch 20 or from the comparator 10 which monitors the cross-acceleration.

An OR element 42 produces a shifting-back signal R2 if a shifting-back signal is present from the AND element 30 or from the AND element 15 which monitors the braking function, or from both AND elements.

An OR element 43 applies a shifting-up signal H to the program control 3 if a signal is present from an AND element 44 or from an AND element 45 or from both AND elements. The AND element 44 produces a signal only if a shifting-up signal from the comparator 21 is present and no shifting-back signal R1 from the comparator 23 is present while the AND element 45 produces a shifting-up signal only if a shifting-up signal H2 from the AND element 40 is present and no shifting-back signal R2 from the OR element 42 is present and no shifting-back signal R1 from the comparator 23 is present.

An OR element 46 produces a shifting-back signal R to the program control 3 if a signal is present either from the AND element 47 or from an AND element 48 or from both. The AND element 47 produces a signal only if a shifting-back signal R1 from the comparator 23 is present and no shifting-up signal from the comparator 21 is present. The AND element 48 produces a signal only if no shifting-up signal H1 from the comparator 21 is present and no shifting-up signal H2 from the AND element 40 is present and a shifting-back signal R2 from the OR element 42 is present.

It is additionally appropriate to reset the drive pedal activity $\bar{\phi}$ to a base value as a function of predetermined operating conditions. This base value may correspond to a starting value to which the drive pedal activity $\bar{\phi}$ is set necessarily by the drive pedal computer unit 6 after an interruption of the ignition current (computer initialization or set up). The base value, however, may also correspond to the value of the drive pedal activity $\bar{\phi}$ with a drive pedal non-actuated over $(m+1)$ scanning intervals, especially the value zero.

Figure 3:
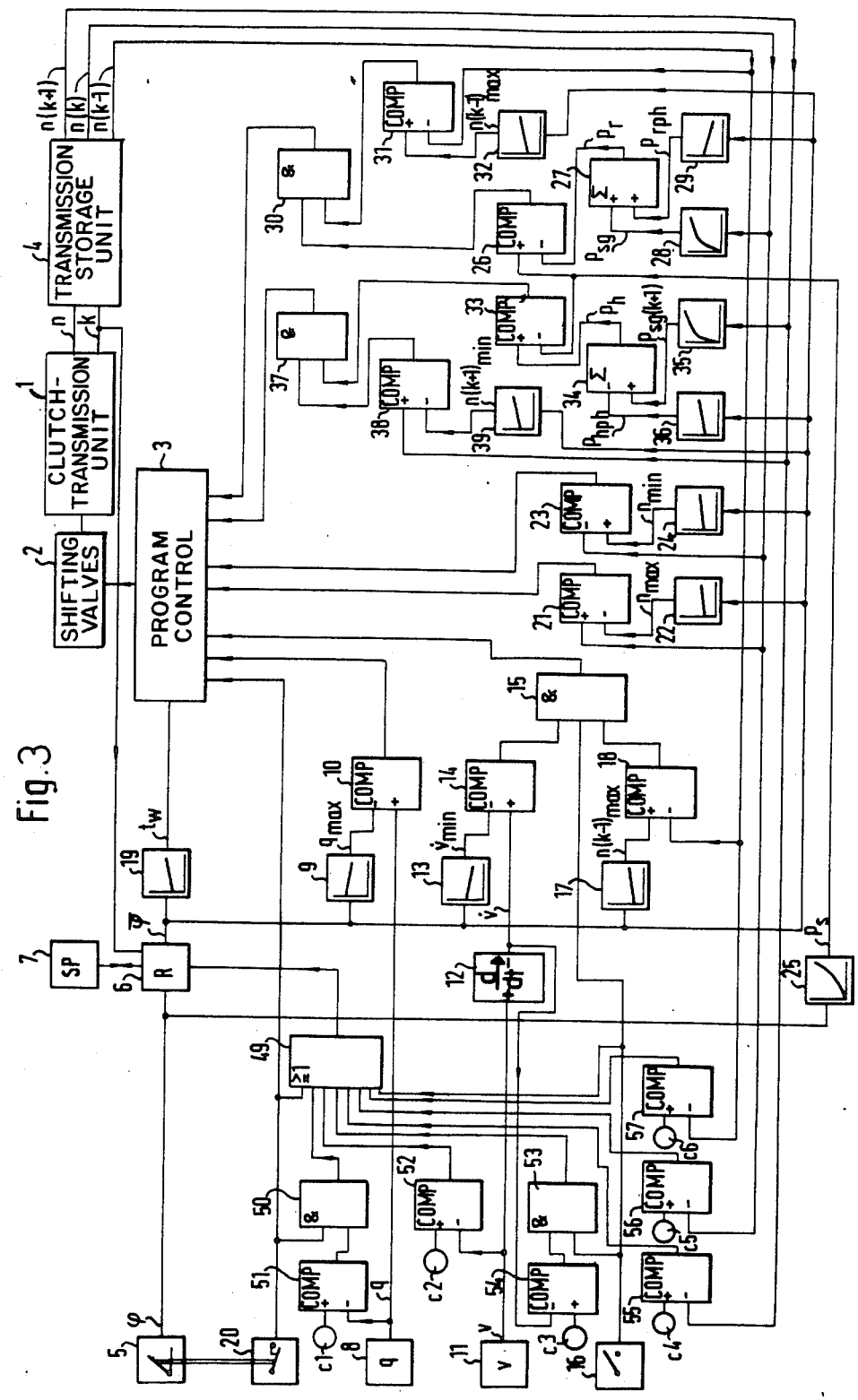
FIGS. 3-5 are block diagrams of further modified embodiments of the block diagram according to FIG. 1.

An embodiment for a corresponding enlargement of the block diagram according to FIG. 1 is illustrated in FIG. 3. The resetting of the drive pedal activity $\bar{\phi}$ to the base value can take place by the drive pedal computer unit 6 with a change of the engaged speed k and/or with a reset signal from an OR element 49.

The OR element 49 produces a reset signal to the drive pedal computer unit 6 if signals exist at one or several or at all of its inputs.

These signals are produced by:
the drive pedal switch 20;
an AND element 50, if signals exist at the same time from the drive pedal switch 20 and from a comparator 51, whereby the comparator then produces a signal when the cross-acceleration q is smaller than a minimum transverse acceleration c1;
a comparator 52, if the velocity v is smaller than a minimum velocity c2;
the brake pedal switch 16;
an AND element 53 if signals exist at the same time from the brake pedal switch 16 and from a comparator 54, whereby this takes place from the comparator 54 when the deceleration $\dot{v}$ is smaller than a minimum deceleration c3;
from a comparator 55, if the transmission input rotational speed in the next higher gear n(k+1) is smaller than a minimum rotational speed c4; from a comparator 56, if the transmission input rotational speed n(k) is smaller than a minimum rotational speed c5;
from a comparator 57, if the transmission input rotational speed n(k−1) is smaller than a minimum rotational speed c6.

In an advantageous manner, the input signals of the OR element 49 may also be linked logically directly in the drive pedal computer unit 6. An example therefor is shown in FIG. 4.

Figure 5:
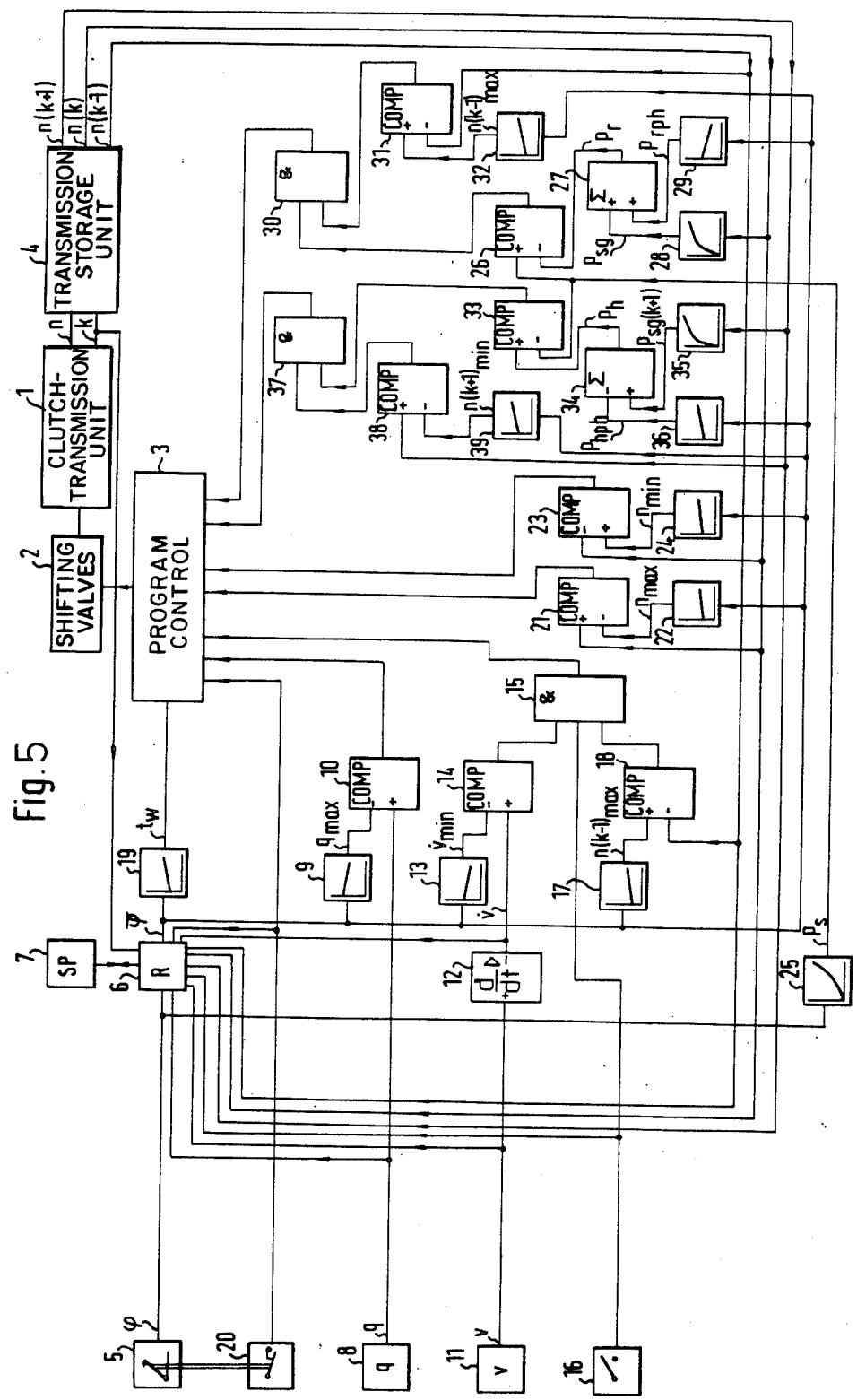

Furthermore, the possibility exists to detect the signals of the drive pedal switch 20, of the transverse acceleration sensor 8, of the velocity sensor 11, of the differentiator 12, of the brake pedal switch 16, of the transmission storage unit 4 and of the clutch transmission unit 1 also directly by means of the drive pedal computer unit 6 and to process into reset criteria for the drive pedal activity $\bar{\phi}$, as is illustrated in the embodiment according to FIG. 5.

Figure 4:
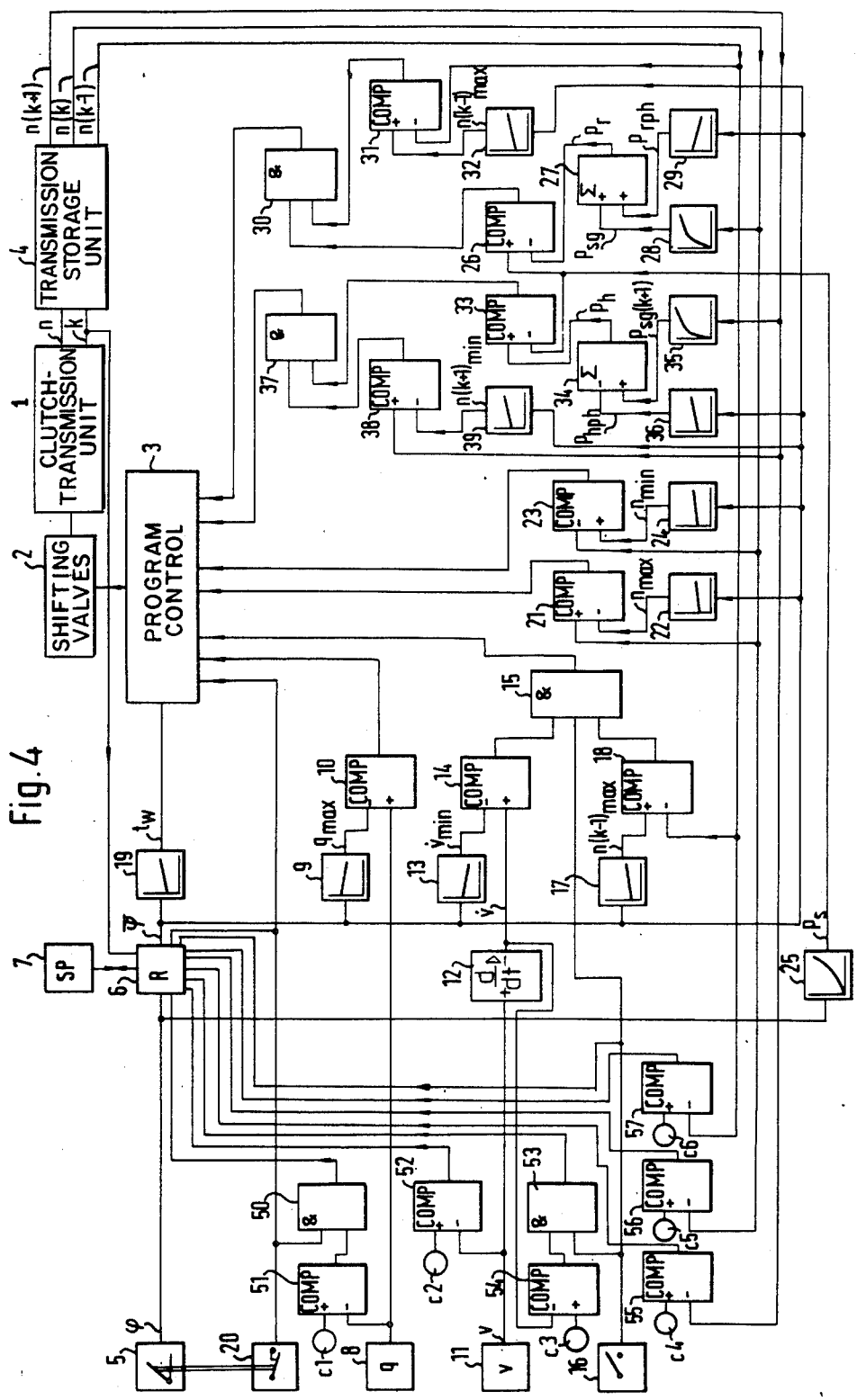

The signals processed in the embodiments of FIGS. 3 to 5 into reset criteria need not necessarily be used in their entirety; however, also individual criteria may be sufficient, for example, the change of the engaged gear k and of the drive pedal switch 20 and possibly additionally also of the brake pedal switch 16.

Furthermore, the task of the computer and comparator circuits as well as of the program control can also be solved by means of a digital computer 59 as illustrated in FIG. 6. The signals of the sensors drive pedal 5, drive pedal switch 20, transverse acceleration sensor 8, velocity sensor 11 and brake pedal switch 16 as well as the signals detected at the clutch-transmission unit 1, transmission output rotational speed n and engaged speed k are applied as inputs to the digital computer 59. A storage unit 60 is connected to the digital computer 59 in which are also stored the characteristic curves of the characteristic curve converters which are constructed as read only memories (ROMs, PROMs and EPROMs). The characteristic curves reproduced by the characteristic curve converters may be different dependent on speed or gear and the characteristic curves of the respective characteristic curve converters may also be obtained for the individual speeds by additive multiples from one another. The digital computer 59 controls directly the shifting valves 2 which actuate the elements of the clutch-transmission unit 1.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A method for controlling a clutch transmission unit of a vehicle equipped with an internal combustion engine, in which the internal combustion engine is adapted to be influenced by an output control device including a drive pedal, and in which the gears of the transmission unit are automatically shifted at least dependent on the position of the drive pedal and the engine rotational speed, comprising the steps of
detecting a drive pedal signal proportional to the position of the drive pedal,
continuously scanning and storing values of the detected drive pedal signal at scanning intervals,
calculating from the stored drive pedal signal values a drive pedal activity as a weighted sum of the stored drive pedal signal values, and
changing limit values for shifting decisions as a function of said driven pedal activity.

2. A method according to claim 1, wherein the drive pedal signal is scanned cyclically.

3. A method according to claim 1, wherein the drive pedal signal is scanned anticyclically.

4. A method according to claim 1, comprising the steps of making the shifting decisions by one of comparison and logic linking of the limit values with signals obtained by measurements as well as with values calculated from the transmission output rotational speed and the engaged speed.

5. A method according to claim 4, wherein said signals obtained by measurements are at least one of transverse acceleration, deceleration, braking operation, coasting operation and transmission output rotational speed.

6. A method according to claim 5, wherein said calculated values include at least one of transmission input rotational speed, transmission input rotational speed in the next higher gear and transmission input rotational speed in the next lower gear.

7. A method according to claim 1, wherein the limit values for the shifting decisions which are changed by the drive pedal activity include the values of
shifting limit for shifting-up,
shifting limit for shifting-down,
width of the shifting line optimized for consumption which is expanded for the shifting quieting into a shifting hysteresis forming a shifting hysteresis width,
minimum rotational speed in the engaged gear,
maximum rotational speed in the engaged gear,
minimum rotational speed in the next higher gear,
maximum rotational speed in the next lower gear,
maximum transverse acceleration which still permits a shifting-up,
minimum deceleration above which a shifting-back takes place during the braking, maximum possible rotational speed in the next lower gear which still permits a shifting-down during braking, and waiting period until shifting-up takes place.

8. A method according to claim 1, wherein with increasing drive pedal activity the limit values of shifting limit for shifting-up, minimum rotational speed in the engaged gear, maximum rotational speed in the engaged gear, minimum rotational speed in the next higher gear, maximum rotational speed in the next lower gear, maximum possible rotational speed in the next lower gear at which during braking a shifting-down is still permitted, and waiting period until shifting-up takes place, are increased, and the limit values shifting limit for shifting-down, shifting hysteresis width, maximum transverse acceleration which still permits a shifting-up, and minimum deceleration above which a shifting-down still takes place during the braking are reduced.

9. A method according to claim 8, wherein the drive pedal activity is reset to a base value in dependence on a reset signal.

10. A method according to claim 9, wherein the base value is the starting value.

11. A method according to claim 9, wherein the base value corresponds to the value of the drive pedal activity with a drive pedal that has not been actuated over predetermined scanning intervals.

12. A method according to claim 11, wherein the reset signal is obtained from at least one signal obtained by at least one of measurement and calculation.

13. A method according to claim 12, wherein the reset signal is obtained by measurement and calculation from at least one of transverse acceleration, deceleration, braking operation, coasting operation, transmission input rotational speed, transmission input rotational speed in the next higher gear, transmission input rotational speed in the next lower gear, and the engaged speed.

14. A method according to claim 13, wherein the reset signal is obtained by logic linking.

15. A method according to claim 14, wherein the reset signal is obtained by direct logic linking.

16. A method according to claim 14, wherein the reset signal is obtained by indirect logic linking.

17. A method according to claim 14, wherein the reset signal is obtained by a comparison of the signals with defined limit values.

18. A method according to claim 1, wherein the drive pedal activity is reset to a base value in dependence on a reset signal.

19. A method according to claim 18, wherein the base value is the starting value.

20. A method according to claim 18, wherein the base value corresponds to the value of the drive pedal activity with a drive pedal that has not been actuated over predetermined scanning intervals.

21. A method according to claim 18, wherein the reset signal is obtained from at least one signal obtained by at least one of measurement and calculation.

22. A method according to claim 21, wherein the reset signal is obtained by measurement and calculation from at least one of transverse acceleration, deceleration, braking operation, coasting operation, transmission input rotational speed, transmission input rotational speed in the next higher gear, transmission input rotational speed in the next lower gear, and the engaged speed.

23. A method according to claim 22, wherein the reset signal is obtained by logic linking.

24. A method according to claim 23, wherein the reset signal is obtained by a comparison of the signals with defined limit values.

25. An apparatus for the control of a clutch transmission unit of a vehicle equipped with an internal combustion engine, in which the internal combustion engine is adapted to be influenced by a drive pedal, comprising:

drive pedal computer means operable to scan drive pedal signal values, to continuously update the drive pedal signal values scanned over scanning intervals and stored in a first memory means, and to calculate from said drive pedal values the drive pedal activity as a weighted sum of the stored drive pedal signal values, and first characteristic curve converter means, for changing the limit values of shifting decisions as a function of the drive pedal activity.

26. An apparatus for the control of a clutch transmission unit of a vehicle equipped with an internal combustion engine, in which the internal combustion engine is adapted to be influenced by a drive pedal, comprising drive pedal computer means operable to scan drive pedal signal values, to continuously update the drive pedal signal values scanned over scanning intervals and stored in a first memory means, and to calculate from said drive pedal values the drive pedal activity, first characteristic curve converter means for changing the limit values of shifting decisions as a function of the drive pedal activity, sensor means for detecting signals indicative of at least several of transverse acceleration, braking operation, coasting operation, vehicle velocity from which a deceleration signal is obtained by means of a differentiator, transmission output rotational speed and the engaged gear, transmission translator means for deriving, from the transmission output rotational speed and the engaged gear, the signals of transmission input rotational speed, transmission input rotational speed in the next higher gear and transmission input speed in the next lower gear, second characteristic curve converter means for producing a desired output value signal determined from the drive pedal position, program control means for controlling a clutch transmission unit, means for processing said detected and calculated signals and applying the processed signals to said program control means, and means for determining the waiting period for a shifting-up operation which is determined by a third characteristic curve converter means from the drive pedal activity and is applied to the program control means.

27. An apparatus according to claim 26, wherein the signals are processed by comparison with limit values in comparator means.

28. An apparatus according to claim 26, wherein the signals are processed into shifting signals by logic circuit means.

29. An apparatus according to claim 28, wherein the shifting signals applied to the program control means are subjected to a priority control means which is constructed as logic circuit means.

30. An apparatus according to claim 29, wherein the priority control means is a component of the program control means.

31. An apparatus according to claim 26, wherein at least some of the signals of transverse acceleration, braking operation, coasting operation, velocity, deceleration, transmission input rotational speed, transmission input rotational speed in the next higher gear, transmission input rotational speed in the next lower gear and engaged gear are compared by comparator means with defined limit values, and means for resetting the drive pedal activity as a function thereof to a base value within the drive pedal computer means.

32. An apparatus according to claim 31, wherein said base value is zero.

33. An apparatus according to claim 31, wherein the signals transverse acceleration, braking operation, coasting operation, velocity, deceleration, transmission input rotational speed, transmission input rotational speed in the next higher gear, transmission input rotational speed in the next lower gear and engaged speed are processed in logic circuit means into a reset signal, and means for resetting the drive pedal activity to a base value as a function of said processed signal within the drive pedal computer means.

34. An apparatus according to claim 33, wherein the logic comparisons take place at least partially in the drive pedal computer means.

35. An apparatus according to claim 33, wherein the logic comparisons take place entirely in the drive pedal computer means.

36. An apparatus according to claim 31, wherein the signals are detected and processed directly by the drive pedal computer means.

37. An apparatus according to claim 31, further comprising a digital computer means assuming the task of calculating and comparison circuits as well as program control.

38. An apparatus according to claim 37, wherein the characteristic curve converter means are constructed as read only memories, in which the characteristic curves are stored quasi-continuously.

39. An apparatus according to claim 31, wherein the characteristic curves reproduced by the characteristic curve converter means are each different dependent on gear.

40. An apparatus according to claim 39, wherein the characteristic curves of the characteristic curve converter means for the individual gears are obtained from one another by additive multiples.

* * * * *